United States Patent
Christensen (10) Patent No.: US 6,928,040 B2
(45) Date of Patent: Aug. 9, 2005

(54) IDENTIFYING COPY PROTECTED OPTICAL COMPACT DISCS

(75) Inventor: Kjeld K. Christensen, Sunnyvale, CA (US)

(73) Assignee: Macrovision Corporation, Sunnyvale, CA (US)

( * ) Notice: Subject to any disclaimer, the term of this patent is extended or adjusted under 35 U.S.C. 154(b) by 125 days.

(21) Appl. No.: 09/790,174

(22) Filed: Feb. 21, 2001

(65) Prior Publication Data

US 2002/0009033 A1 Jan. 24, 2002

Related U.S. Application Data (60) Provisional application No. 60/211,858, filed on Jun. 14, 2000.

(51) Int. Cl.[7] ............................................. G11B 7/00
(52) U.S. Cl. ................................................. 369/53.21
(58) Field of Search ........................... 369/53.21; 360/60

(56) References Cited

U.S. PATENT DOCUMENTS

| | | | | | |
|---|---|---|---|---|---|
| 4,389,681 | A | * | 6/1983 | Tanaka et al. ................. | 360/27 |
| 4,682,317 | A | * | 7/1987 | Tomisawa ................. | 369/59.25 |
| 5,428,598 | A | * | 6/1995 | Veldhuis et al. ........ | 369/275.3 |
| 5,453,968 | A | * | 9/1995 | Veldhuis et al. .............. | 369/84 |
| 5,506,821 | A | * | 4/1996 | Burton, Jr. ................ | 369/30.24 |
| 5,825,731 | A | * | 10/1998 | Yokota ................ | 369/53.21 X |
| 6,072,759 | A | * | 6/2000 | Maeda et al. ............ | 369/59.25 |
| 6,104,679 | A | * | 8/2000 | Sollish ..................... | 369/53.21 |
| 6,108,296 | A | * | 8/2000 | Kajiyama et al. ........ | 369/275.4 |
| 6,163,515 | A | * | 12/2000 | Yamamoto ................. | 369/53.2 |
| 6,288,989 | B1 | * | 9/2001 | Ro et al. ................. | 369/47.13 |
| 6,289,102 | B1 | * | 9/2001 | Ueda et al. ................. | 380/201 |
| 6,462,753 | B1 | * | 10/2002 | Koyata et al. .............. | 345/716 |
| 6,516,064 | B1 | * | 2/2003 | Osawa et al. ............... | 380/201 |
| 6,522,607 | B1 | * | 2/2003 | Ishibashi et al. ........... | 369/47.1 |
| 6,526,146 | B1 | * | 2/2003 | Hashimoto et al. ......... | 380/201 |
| 6,526,510 | B1 | * | 2/2003 | Kori et al. .................. | 713/176 |
| 6,535,858 | B1 | * | 3/2003 | Blaukovitsch et al. ........ | 705/57 |

FOREIGN PATENT DOCUMENTS

| | | | | |
|---|---|---|---|---|
| EP | 0697699 A2 | * | 2/1996 | |
| JP | 8-153331 | * | 11/1996 | .......... G11B/7/007 |
| JP | 11-238305 | * | 8/1999 | .......... G11B/20/10 |

* cited by examiner

Primary Examiner—Aristotelis M Psitos
(74) Attorney, Agent, or Firm—Morrison & Foerster, LLP (57) ABSTRACT

A method and associated apparatus for identifying, to manufacturing test equipment, copy protection information contained on a compact disc (CD). The method includes adding data in standardized industry formats to unused sectors of a CD and providing the capability to test equipment to read the data. The added data is unreadable and ignored by conventional compact disc readers and compact disc drives. The added data is defined by manufacturers and users of copy protection techniques. Additional copy protection verification can be accomplished by using specialized verification tools.

10 Claims, 5 Drawing Sheets

IDENTIFYING COPY PROTECTED OPTICAL COMPACT DISCS

CROSS REFERENCE TO RELATED APPLICATIONS

This application claims priority to U.S. Provisional Application Ser. No. 60/211,858, filed Jun. 14, 2000.

FIELD OF THE INVENTION

This disclosure relates to encoding optical compact discs, in order to allow industry test equipment to be made aware of and properly identify copy protection techniques, if employed, on an optical compact disc.

BACKGROUND

Publishers and developers of consumer entertainment, educational, reference and business application software and music have found a great need to protect their works, works published on digital media, such as optical compact discs (CD) from illicit copying. To this end, copy protection schemes have been developed. Examples of such copy protection schemes are Macrovision Corporation's SAFEDISC® copy protection. SAFEDISC® copy protection effectively deters unauthorized copying and remastering of CDs. These schemes involve security and rights management technology, which prevent unauthorized use, copying or distribution of CDs.

These copy protection schemes incorporate encryption, digital signature and license manager technologies, and enable authentication from either the CD, personal computer (PC) hard drive, CD player, or other related devices (hereinafter collectively referred to as "readers"). Schemes such as SAFEDISC® may include a digital signature; an encrypted wrapper protecting the content including authentication instructions; and anti-hacking software.

CD Manufacturing

The CD manufacturing process begins with the preparation of a master tape, recordable CD, or other carrier medium (hereinafter collectively referred to as the "original master") containing the intellectual property to be transferred to a compact disc (CD). This step called "authoring" can be accomplished in a suitably equipped recording studio. The original master disc may contain one or more of the following information: video, audio, or digital data.

The original master, or an exact copy thereof, is then delivered to the CD manufacturing plant together with information about how the final CD should be laid out or structured, if such information is needed.

The first step is to transfer the information from the from the original master to a master CD in the desired manner. This process step is known as "mastering". The mastering equipment reads the original master and instructions, and proceeds to encode and format the digital data, and add synchronization, timing, and other pertinent information in accordance with the relevant CD format specifications. The output from this "mastering" process is a digital eight to fourteen modulated (EFM) signal used to modulate a laser beam. The laser beam is commonly, but not exclusively, aimed at a rotating glass plate with a photosensitive layer called a "glass master." Speed and linear translation mechanisms allow the EFM signal to be transferred to the photosensitive layer in a spiral containing alternating exposed and non-exposed areas. When the process is completed, the spiral contains a complete physical image of all information contained on the final CD.

The remaining parts of the CD manufacturing process is concerned with transferring, or "mirroring," the image from the glass master to the plastic disc known as a CD.

During the authoring and/or mastering process, the digital information may be encrypted or otherwise altered as part of a copy protection scheme such as SAFEDISC®. SAFEDISC® copy protection has an encrypted "wrapper" protection feature that protects the application and a digital signature. Typically, a publisher completes test build and release build processes while encrypting the programs or image file. A test version of the encrypted original master can be made on a recordable CD also known as a gold disc, which when used in conjunction with a special key disc allows functional verification of the process and title performance. In the release build a final unique encryption key is added to the tape, disc, or gold disc.

Figure 1:
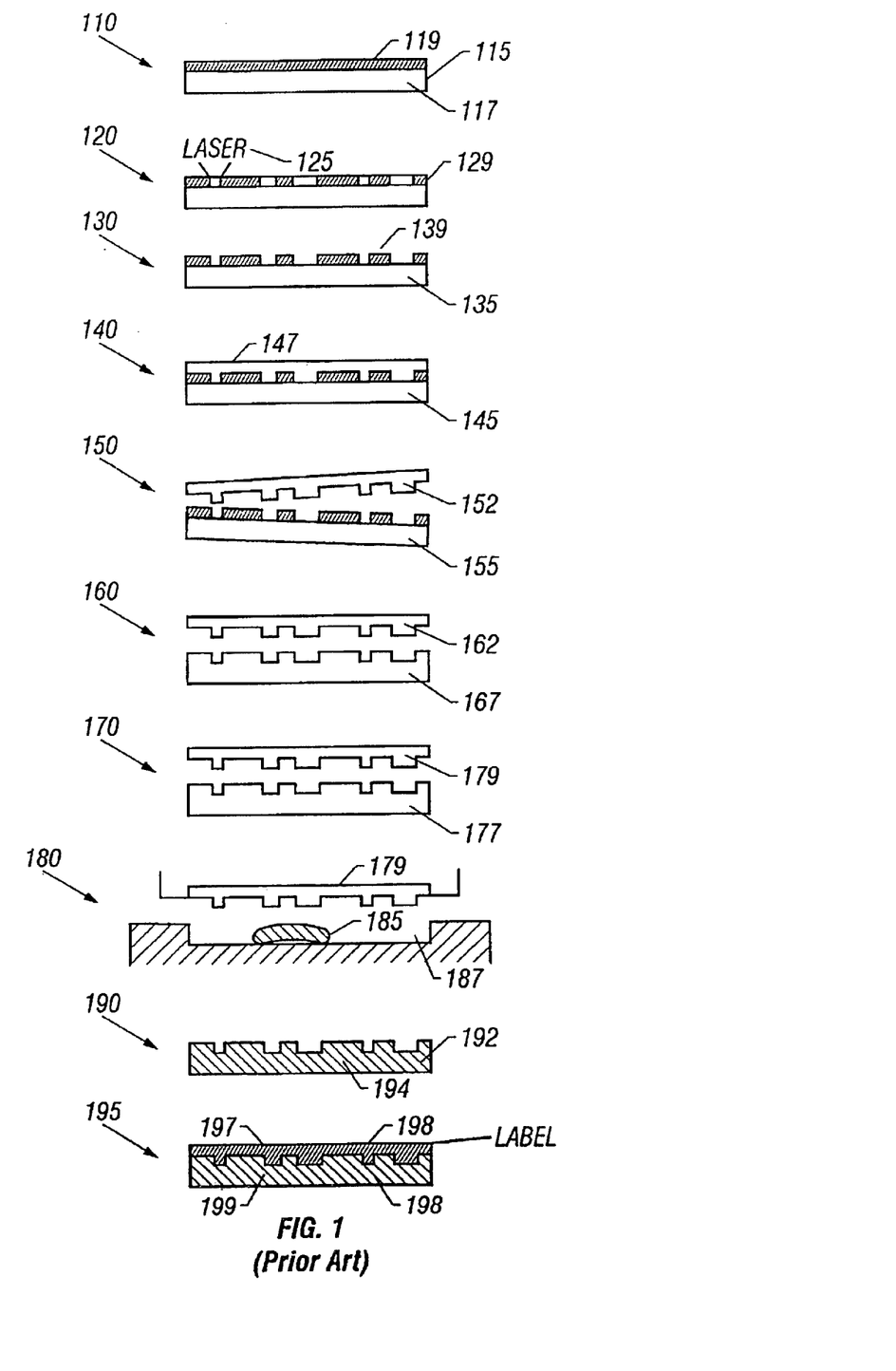
FIG. 1 represents the conventional manufacturing process of an optical compact disc (CD).

Now referring to FIG. 1, the conventional manufacturing process for a CD, regardless of format (i.e. Audio or CD-ROM) is illustrated. The manufacturing process begins with step 110, the making of a glass master 115. A glass plate 117 approximately 120 to 240 millimeters in diameter is made flat, polished and coated with a photoresist layer 119.

Step 120 involves writing information contained on the master tape to the disc. A laser 125 writes (exposes) the encoded digital pattern from the master tape (or other media such as a disc, or gold disc) into the photoresist 129. For copy protection schemes the process may include adding an authentication process. The authentication process involves adding a unique authentication signature to a title during creation of the glass master 115. Encoding software modified to accommodate the SAFEDISC® copy protection scheme, automatically reads the prepared original master and adds a unique authentication signature to the glass master 115.

Step 130 involves the development of the photoresist 129. A layer of metal, typically silver over a nickel flash, is evaporated over the remaining (post-development) photoresist 129. The glass master 135 may then be checked for accuracy by playing the glass master V 135 on a suitable player.

Step 140 involves subjecting the glass master 135 to an electroforming process. This electromchemical process involves depositing additional metal 147 onto the silver layer of the glass master disc 135.

In step 150, when the metal becomes thick enough, it is separated from the glass master 135. This metal negative impression of the disc is called a father 152.

As step 160 illustrates, the electroforming process is repeated on the father 152 to produce metal impressions, called a mother 167. Typically 3 to 6 mothers 167 may be made before the quality of the father 152 degrades.

Step 170 illustrates the electroforming process conducted on a mother 167 to create a son or a stamper 179. A mother 167 typically can make 3 to6 stampers 179. A stamper 179 is suitable as a mold to injection mold production discs.

Step 180 illustrates the disc molding process. With a stamper 179, production CDs are injection molded using polycarbonate 185 into the cavity 187.

In step 190, once the disc 192 is molded, a metal layer 194 is used to coat the disc 192. Typically, aluminum and silver are used as the metal layer 194 and is applied through an evaporation process.

Step 195 illustrates the finishing process where a thin layer of lacquer 197 about 1 to 30 microns thick is spin coated over the metal layer 196. The layer 197 fills in the pits of the disc 199.

Throughout this manufacturing process, production or manufacturing test equipment is used to test the CDs, be it a master, a stamper, or a production CD (the term "CD" or "compact disc" is used here to refer to all these entities). The test equipment plays the CD so as to check for physical, electrical, or format related errors on the CD, and identifying using timing information where the error or errors have occurred.

Verification tools may be necessary because when CDs use copy protection techniques, the copy protection encoding often causes side effects with manufacturing test equipment used in manufacturing. Copy protection techniques such as SAFEDISC® are sometimes referred to as invasive or intrusive if it includes deliberate modification of the CD layout causing physical, electrical, or format related errors to occur during playback. These deliberate errors, referred to as the digital signature or fingerprint, are part of the copy protection in that they are not easily transferred in the same pattern to a recordable CD. The presence or absence of the errors can thus be used to distinguish an original CD from an illegal copy.

Because of these invasive or intrusive copy protection schemes the test equipment used to test CDs in the manufacturing process might incorrectly determine that a CD does not meet quality requirements, when, in fact, it does. Digital signatures may cause errors when a CD is read by test equipment during the normal manufacturing process. This creates an obvious challenge for CD manufacturing and publishing companies, who must distinguish between errors caused by presence of the digital signature of the copy protection scheme (false error) and errors caused by the production process (actual errors).

Test equipment is generally highly specialized and employs unique CD readers and software. This, together with the variety of equipment, and its worldwide distribution, makes it extremely difficult to modify the equipment and keep it updated to cope with not only SAFEDISC®, but other copy protections as well.

The results obtained from production test equipment only indicate how well a CD is made, but tells nothing about the data content itself. This is normally sample tested by data verification equipment capable of analyzing the data structures and comparing the final CD with the original master.

As part of the test and verification process, it is necessary for the equipment to be able to detect and identify any copy protection used on a given CD, in order to allow for special tests to be made to verify the copy protection itself. At the same time it is important that this information be transparent to commercial CD readers, to avoid any possible negative effects on the playback of the CD content.

Data Encoding

Information on CDs is contained in pits (depressions) impressed into the CD's plastic substrate by the above-described process. A pit is about 0.6 micrometers wide. Each pit edge represents a binary one (1). Flat areas between or areas within pits represent binary zero(s) 0. The pits on a CD are aligned in a spiral track running from the inside diameter of the CD to the outside.

A finished CD is structured logically into three areas: a lead-in area, a program area, and a lead-out area. The lead-in area is used to synchronize the data stream and to store the Table of Contents (TOC). The program area contains all user digital data, and the lead-out area acts as a "filler" to fill in the remaining CD space.

Figure 2:
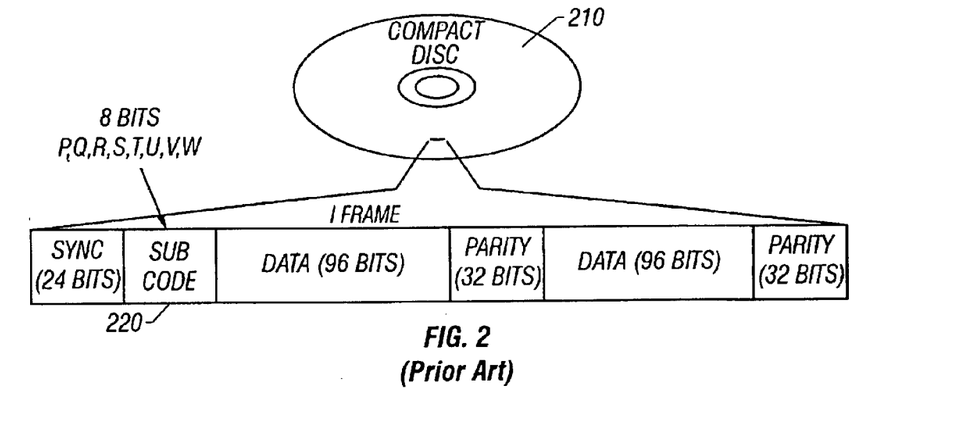
FIG. 2 represents conventional data bit structure of a frame on a CD.

The information (data) on a CD is formatted (organized) by frames. A frame is defined as the smallest complete section of recognizable data on a CD. FIG. 2 illustrates the frame format for a CD-Audio disc 210 prior to eight to fourteen (EFM) modulation. All required data is placed into the frame format during CD encoding. Each frame contains eight subcode bits 220. The eight subcode bits 220 contain information describing where tracks begin and end, track numbers, CD timing, index points, and other parameters. The eight subcode bits 210 are designated as P, Q, R, S, T, U, V, and W.

Figure 3:
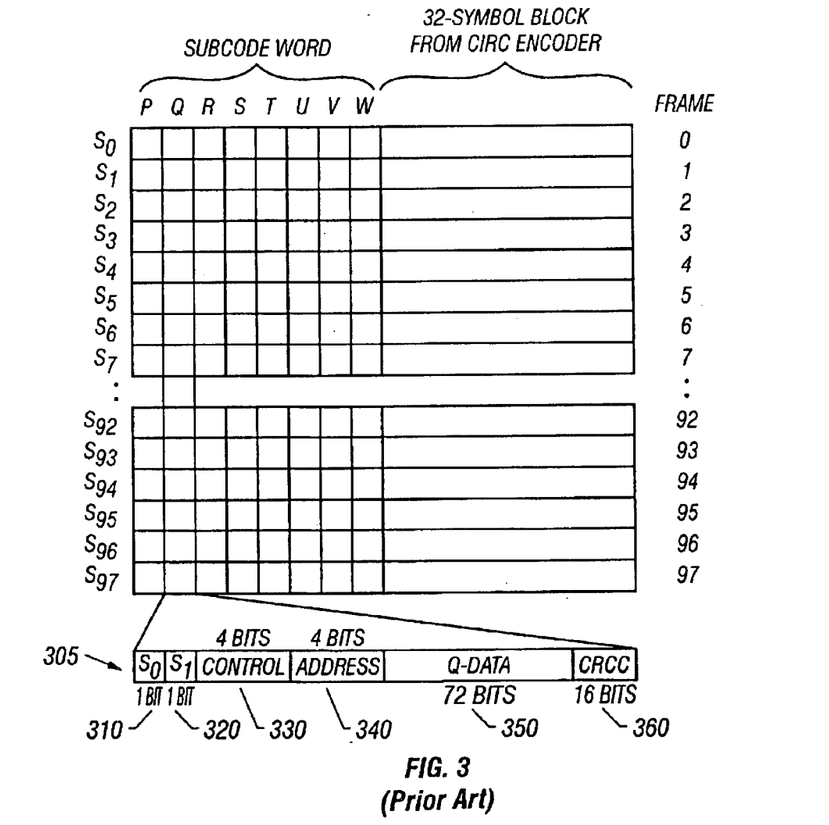
FIG. 3 represents the combination of 98 frames into a conventional CD-Audio data block, with the general format of the subcode Q-channel shown.

FIG. 3 illustrates how blocks or sectors are structured. A subcode block is constructed sequentially of 98 successive frames. The 98 frames make up a sector. In a CD, there are 330,000 sectors within the program area. FIG. 3 further illustrates eight channels as represented by subcode bits P, Q, R, S, T, U, V, W. On most audio CDs only P and Q subcode channels contain information while the other six channels contain zeros. The P channel contains a flag bit to indicate beginning and end of certain areas. The actual data such as music is contained within the 32-symbol block known as the main channel. FIG. 3 also illustrates the subcode or data block 305 (channel) structure and illustrates the data block format of the 98 bit word for the channel. The start of each data block 305 is denoted by the $S_1$ 310 and $S_0$ 320 synchronization (sync) bits. Four control bits 330 follow the synchronization bits. Four address bits 340, which define channel mode, follow the control bits. These four address bits define the mode address of the channel and are referred to by their hexadecimal equivalents. Modes 0, 1, 2 and 3 are currently reserved modes. Mode 0 is an all zeros data block. Because the address bits provide for 16 modes, with four modes reserved, 12 unreserved modes are available for use. The four address bits 340 are followed by 72 data bits 350. The last sixteen data bits 360 are used as a cyclic redundancy code check (CRCC) also known as a cyclic redundancy code (CRC). A CRCC or CRC is used to assure that the data block when it is read is correct.

The specifications that govern physical, and content standards for CDs are set by the International Standards Organization (ISO) and International Electrotechnical Commission (IEC). These specifications define what modes are used for what purpose by CD manufacturers and publishers. For CD-Audio the specification commonly is referred to as the "Red Book." For CD-ROM the specification is the "Yellow Book." For CD-I (Interactive) the specification is the "Green Book." For Video CD the specification is the "White Book." The specifications share the same common 98 bit data subcode block structure and formatting. Current test equipment used to check CDs during the production or manufacturing process relies on the specification in translating data block words.

A need has been felt for a method and apparatus that can recognize and identify copy protection in the testing process. The identification of copy protection should only be seen by compliant test equipment and should be transparent to CD readers and players.

SUMMARY

Problems with CD test equipment identified above are addressed by the present method of identifying copy protected compact discs by the test equipment. The method relates to encoding a CD with selected data identifying copy protection techniques. The data can be placed in unused sectors of a CD, in particular in the lead-in area. The Q-channel, where program and timing information resides, will provide the copy protection information to the test equipment.

One embodiment involves using a previously unused mode, for example mode F, of the Q-channel. Mode F would be unrecognized and ignored by CD readers (players), however, the new mode is identifiable to compliant test equipment. An alternate embodiment involves using a unique CRCC (CRC) which is treated as an invalid CRCC and ignored by readers. The unique CRCC, however, is identified by compliant test equipment. This unique CRCC identifies to the test equipment that copy protection data exists. The test equipment can then identify the copy protection and perform any other function as defined in the remaining data of that sector. One embodiment provides for that data to be displayed or used as pointers to files, databases, or external information.

Current industry standards set by IEC and ISO define data block words contained in Q-channel and other channels of a CD. Production test equipment that is governed by IEC and ISO is configured to translate data block words. Therefore, to detect and identify copy protections production test equipment in this method needs only to recognized a new mode or a unique CRCC. Sufficient data is included in these new data blocks to identify the type of copy protection used, and the copy protection manufacturer. If additional verification tests are needed, a manufacturer has sufficient preliminary information regarding copy protection to use the proper verification tools.

DETAILED DESCRIPTION

The present method makes use of current industry standards for CDs. Specific emphasis is on the structure of the subcode channels, with particular use made of the ability of current test equipment to read and decode information stored in the Q subcode channel. Various embodiments utilize previously unused and unreserved data blocks to provide copy protection information to production test equipment.

Instead of reading whatever current copy protection information signatures or data that exists on a CD, data blocks are provided that contain specific copy protection information that may be read by test equipment. In one embodiment, such data blocks reside on unused sectors in the lead-in area or lead-out area of a CD.

Since the purpose of test equipment is to ascertain only the physical characteristics of a CD and indicate how well the CD is made there is no need for the equipment to decode the actual data contained on the CD. Consequently, most test equipment only decode the Q-channel in order to obtain timing information about where on the CD certain test results are obtained. Mode 1 of the Q-Channel is used for timing information, telling the CD reader (test equipment) where on the CD it is looking at any given instant. In the lead-in area of a CD, this timing information makes up a TOC, for example it is used to tell a reader where each song or data file starts and ends. In the program area, i.e. where the songs are stored, the Q-Channel contains the information that is seen on the timer counter of a CD reader. In the case of CD-Audio this tells for example how many seconds have been listened to. Test equipment uses the Q-Channel timing information to identify where on a CD certain test results were obtained. For example, test equipment identifies error locations by reference to the Q-channel timing information. Because test equipment has no need to extract any other kind of data from the bit patterns on a CD, it does not. Hence current test equipment only reads the Q-Channel.

Figure 4:
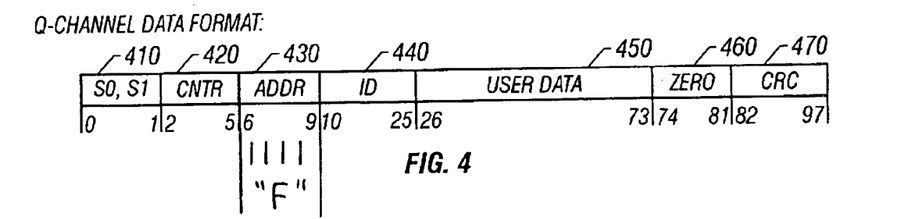
FIG. 4 represents Q-Channel Mode F data block format.

FIG. 4 depicts the data block format for copy protection data blocks used in mode F (hexadecimal value F) of the Q-Channel in an embodiment of the invention. The address field is set to 1111, representing mode F (hexadecimal value). The data is represented by sync field 410; control field 420; address field 430; identification field 440; user data field 450; zero field 460; and CRC field 470.

The table below represents the information contained in the fields of this particular embodiment.

| | |
|---|---|
| S0, S1: | Synchronization |
| Control: | Bits are copied from Mode 1 blocks present in the lead-in area |
| Address: | Mode = F (1111) |
| ID: | Example: |
| User Data | Added/Used by Copy Protection Manufacturer |
| Zero: | 0000 0000 |
| CRC': | 16-bit CRC on the Control, Address, Data, and Zero Fields. |

In this configuration, this 98 bit data block format contains a 16 bit ID field 440 that follows the Address field 430. This ID field 440 is used to identify the manufacturer of the copy protection used by the CD. The User Data field 450 (bits 26 to 73) is left open for copy protection suppliers to provide applicable data that may identify a particular copy protection scheme that is implemented on the CD.

Mode F is provided, but not used nor reserved by industry standards. Conventional CD readers do not recognize data blocks contained in Mode F. In this embodiment the compliant test equipment is modified to look for and recognize Mode F and Mode F data. Such test equipment is thereby alerted that copy protection information resides on a CD by the presence of Mode F in the lead-in area. In this configuration it is preferred to have Mode F data blocks occupy four out of 100 sectors in the lead-in area.

Figure 5:
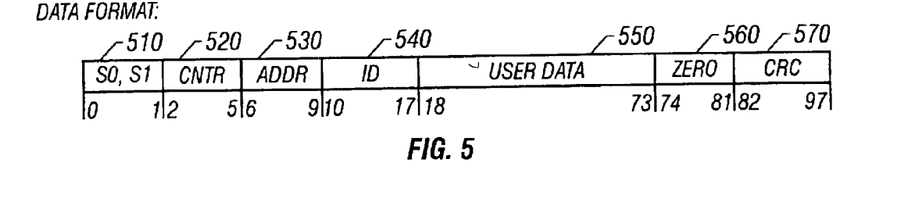
FIG. 5 represents Q-Channel Mode 1 with a modified CRCC data block format.

FIG. 5 depicts the data block format for copy protection data blocks used in mode 1 (hexadecimal value 1) of the Q-Channel using a unique CRCC. Mode 1 of the Q-Channel is provided for and defined in the standards to be used for timing information. In this embodiment Mode 1 is used to eliminate potential compatibility problems. The data is represented by sync field 510; control field 520; Q-Mode (address) field 530; identification (ID) field 540; user data field 550; zero field 560; and CRC' field 570.

In this embodiment the Q-mode (address) field 530 is set to 0001, representing mode 1, a mode familiar to test equipment and CD readers, and used in current applications for timing information. The bits of control field 520 are copied from the settings of other Q-Channel Mode 1 in the lead-in area of the disc, except that the copy protection bit 3 of the control field 520 is always set to "copy prohibited"

(copy protect). The value of bit 3 in the control field is always 0. In this particular embodiment, the eight bit ID field 540 identifies the manufacturer of the copy protection used by the CD.

The user data field 550 is for use by individual copy protection manufacturers. An anticipated use of the user data field 550 includes identifying copy protection signatures in order to avoid false manufacturing reporting errors. The user data field 550 may also be used to test that the copy protection has been correctly manufactured into the CD. Another use is for copy protection revision control. Further, another use is to serve as a link to external files, software programs, algorithms, and equipment.

The following table represents the information contained in the fields of this embodiment.

| | |
|---|---|
| S0, S1: | Sync |
| Control: | XX0X where X is unchanged from normal mode 1 (0 = copy protected) |
| Address: | Mode = 1 (0001) |
| ID: | XX |
| User Data: | Used/Added by Copy Protection Manufacturer |
| Zero: | 0000 0000 |
| CRC': | Modified 16-bit CRC on Control, Address, and Data. |

In order to prevent CD readers from reading this information, the normal CRCC in this embodiment is modified to a new value called CRC' so that it appears as an incorrect value to a reader. When the data block is read by a CD reader or test equipment, a mathematical algorithm using preceding data bits of certain fields, creates a CRC number. In this embodiment, the control 520, address 530, ID 540, data 550, and zero 560 fields are used to create this CRC number 570. This number is then subtracted from the number represented by the CRC field of the data block. If the result is zero, the data is good. In the case of CD readers, if the result is not zero, the data is bad, and dropped (ignored). In this embodiment, the modified CRC is treated as a "wrong" CRC and the associated data block as "bad" data. A one (1) may be added to the "correct" CRC to arrive at a "wrong" CRC. The "bad" data is dropped by CD readers. Test equipment may be modified to recognize the modified CRC.

Figure 6:
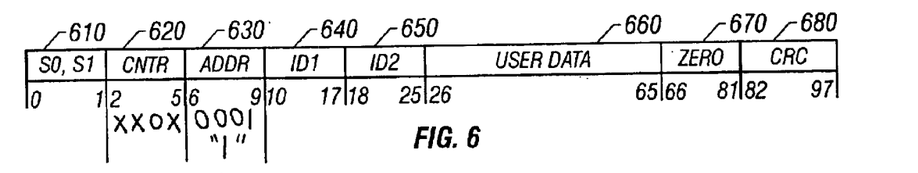
FIG. 6 represents Q-Channel Mode 1 with a modified CRCC and another CRCC used only by test equipment data block format.

FIG. 6 depicts the data block format for copy protection data blocks used in mode 1 (hexadecimal value 1) of the Q-Channel using a modified CRC and having a CRC that can be used by test equipment to translate the data block information. In this particular embodiment the data is represented by sync field 610; control field 620; Mode (address) field 630; ID1 field 640; ID2 650; user data field 660; CRC field 670, and CRC1 field 680.

The following table depicts the information contained in the fields of this embodiment.

| | |
|---|---|
| S0, S1: | Sync |
| Control: | XX0X where X is unchanged from normal mode 1 (0 = copy protected) |
| Address: | Mode = 1 (0001) |
| ID1: | XX |
| ID2: | XX |

-continued

| | |
|---|---|
| User Data: | Used/Added by Copy Protection Manufacturer |
| CRC: | CRC on Control, Mode, ID1, ID2, and User Data (bits 2 through 65) |
| CRC1: | CRC on bits 2 through 81 + 1. |

This particular embodiment uses separate ID fields, ID1 field 640 and Id2 field 650, to provide data regarding manufacturer and product. Additional information unique to the copy protection manufacturer is placed in the user data field 660. A modified CRC, shown as CRC1 field 680 is unrecognized by CD readers and treated as an error. CRC1 field 680, however, is identified by test equipment. Using CRC field 670, the algorithm is run using the preceding control field 620, mode field 630, ID1 field 640, Id2 field 650, and user data field 660 as represented by bits 2 to 65. One method of transcribing the information is to run the data block with particular emphasis on bits 2 to 65 through a second CRC generator. Like any CRC generator, the second CRC generator uses an algorithm to transcribe a correct or good data to come out like the data represented by CRC field 670. Verified correct data will represent that correct copy protection information exists.

Figure 7:
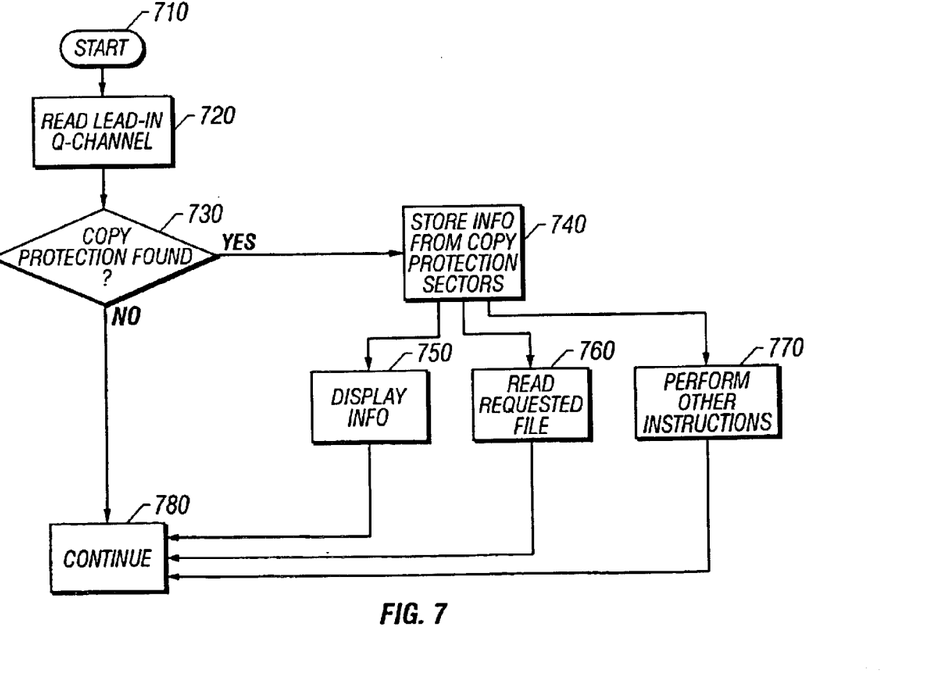
FIG. 7 is a flow chart representing how compliant test equipment can read a CD with copy protection data.

FIG. 7 depicts a flow diagram of how an embodiment of compliant test equipment may read a CD that has copy protection data. A CD is inserted in the test equipment, the CD begins with start 710. Current industry test equipment is configured to only read the Q-Channel of a CD. The test equipment uses the read Q-channel information to identify where on the CD certain test results or errors were obtained. When the test equipment identifies an error location(s), a reference is made to the Q-Channel timing information. To deal with the special problems caused by various copy protection schemes such as SAFEDISC®, the test equipment can use the herein described copy protection identification system in various ways ranging from displaying a simple awareness notice to more elaborate techniques of removing the effects of a given copy protection from the test results, thus rendering the copy protection transparent to the user.

Starting at 710, the compliant test equipment reads the Q-channel sectors 720 in the lead-in area and at 730 determines if copy protection is present on the CD. If not found, the equipment continues with normal operation, 780.

If copy protection is identified, the test equipment stores this information 740, and proceeds to carry out either predetermined actions such as displaying a warning 750, read a file to obtain instructions about how to proceed 760, or carrying out other operations 770 as may be dictated by the information obtained from the copy protection sectors. It is conceivable that more sophisticated test equipment will be capable of using this information to filter or remove the effects of a given copy protection from the test results.

Figure 8:
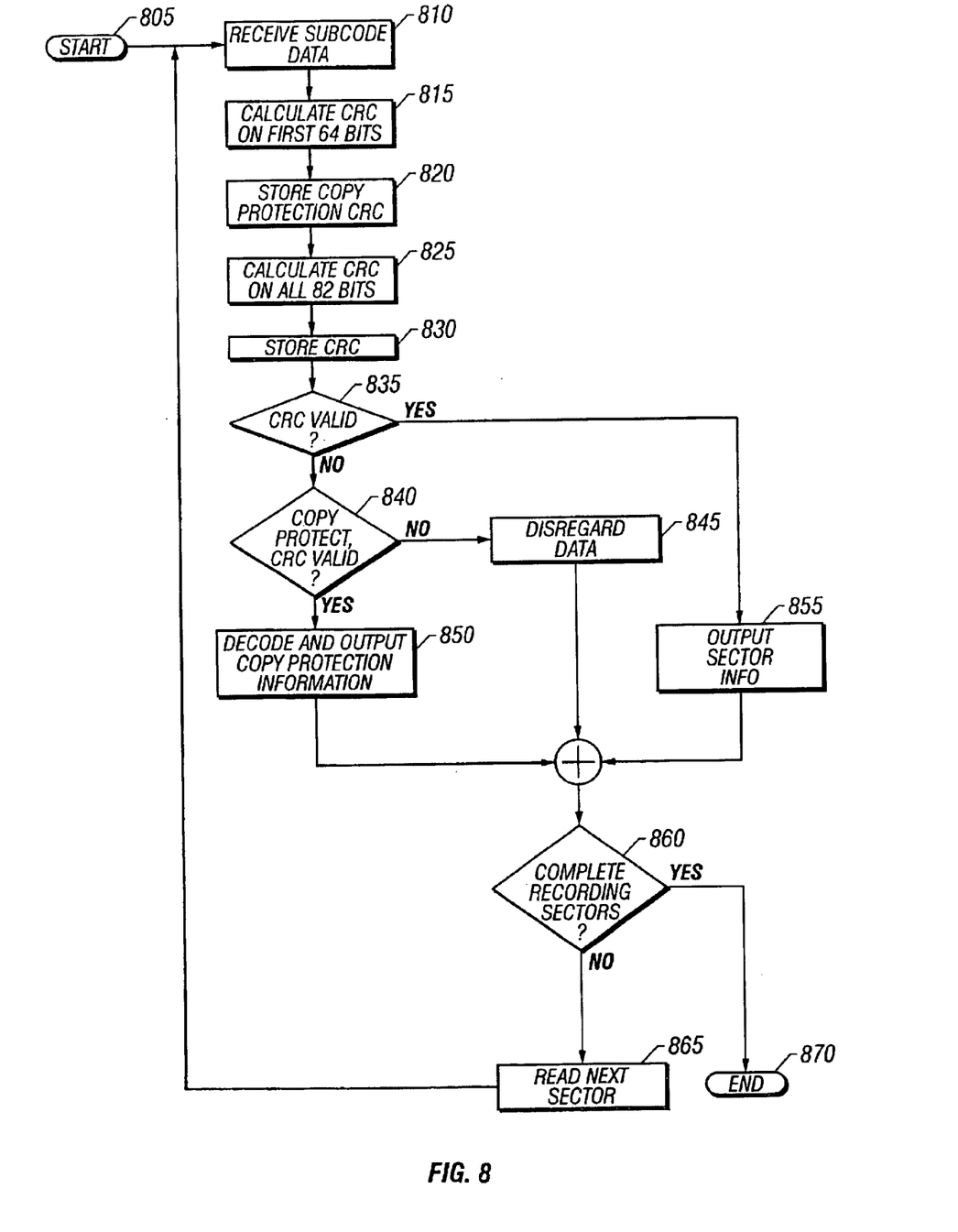
FIG. 8 represents one possible algorithm used in reading a copy protected CD.

FIG. 8 illustrates a flow chart of a process used by the compliant test equipment in identifying copy protection using a separate CRC value for copy protection. A CD is read by test equipment and the algorithm begins with Start 805. The test equipment receives subcode data at 810, the subcode data is comprised of encoded words. In this process each sector is read one at a time. The test equipment then calculates the cyclic redundancy code (CRC) on the first 64 bits of the coded word at 815, this is the copy protection CRC. The copy protection CRC is then stored at 820 and a CRC value on all 82 bits is calculated at 825. This second CRC value is the normally expected CRC value and is stored by the test at equipment 830. A determination is made as to the validity of the data word CRC 835; if this CRC value is valid the test equipment outputs the Q-channel data such as timing information. If the CRC is invalid, a check is performed to see if the copy protection CRC value is valid 840. If not valid the data is disregarded 845. If the data is valid the copy protection information is decoded 850. If additional sectors must be read 860, the test equipment proceeds to read the next sector 865 and proceeds to read successive words. The process continues until all sectors are read, completing at End 870.

Figure 9:
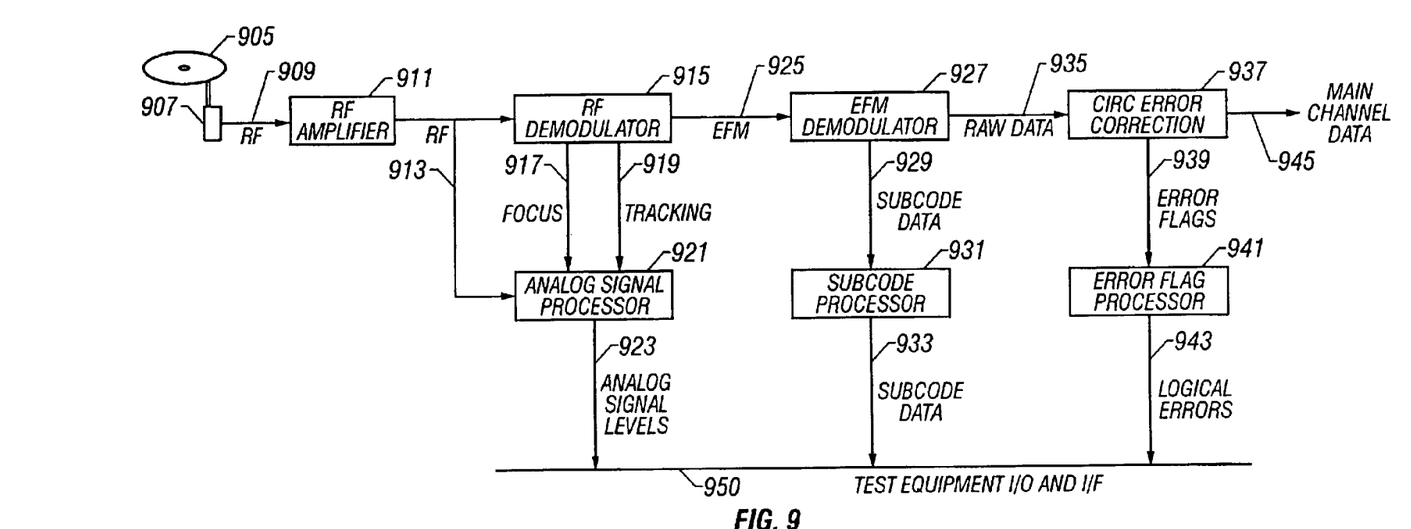
FIG. 9 represents test equipment used to read a copy protected CD.

FIG. 9 illustrates a block diagram of how typical CD test equipment may obtain the data needed for testing CDs as required by the standards. The test equipment commonly includes a standard CD player suitably modified to read and provide needed test information. A CD 905 is read by a conventional laser pick up 907. The laser pick up 907 sends an RF signal 909 to an RF amplifier 911. The RF signal on line 909 is amplified by the RF amplifier 911. The RF signal on line 913 is presented to the RF demodulator 915 and to the analog signal processor 921. The RF demodulator 915 also sends a focus signal on line 917 and a tracking signal on line 919 to an analog processor 921. The analog signal processor 921 receives these input signals and produces response analog signal level signals on line 923. Information provided by analog signal levels on line 923 includes reflectivity, radio noise, push pole, and jitter. This information is read by test equipment input output (I/O) and interface (I/F) 950. The RF demodulator 915 outputs an EFM signal 925. The EFM signal on line 925 is received by EFM demodulator 927. The EFM signal 925 is demodulated so that every 14 bit EFM word is converted to 8 bits. The EFM demodulator 927 outputs a subcode data 929 received by a subcode processor 931. Subcode processor 931 translates the subcode data providing subcode data on line(s) 931 to the test equipment I/O and I/F 950. The subcode data 933 consists of TOC and the copy protection information identifying the copy protection contained in the CD. EFM demodulator 927 outouts raw data 935 to a Cross-Interleave Reed-Solomon coding (CIRC) error correction processor on line 937. The CIRC processor 937 outputs error flag signals 999 to an error flag processor 941. The error flag processor provides logical error signals on line 943 to the test equipment I/O and I/F 950. These logical errors consist of block error rates, burst errors, correctable errors, and uncorrectable errors. Main channel data 945 is output from the CIRC processor 937. Main channel data 945 is essentially music or programs for the user.

Figure 10:
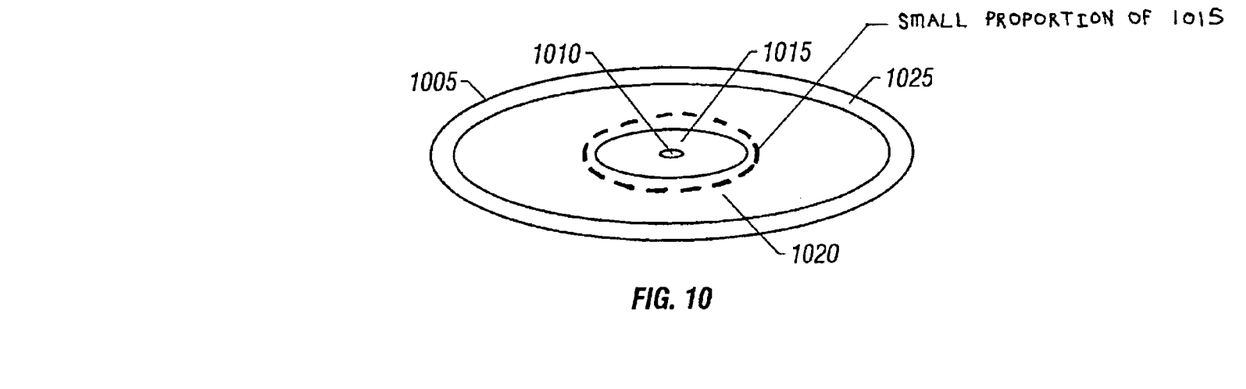
FIG. 10 represents the recorded sections of a CD.

FIG. 10 illustrates a recorded area of a CD. CD 1005 has a center-mounting hole 1010, a lead-in area 1015, a program area 1020, and a lead-out area 1025. As the CD 1005 is spun, the pickup laser starts reading the CD 1005 at the lead-in area 1015. After a few rotations the output signal (not shown) will synchronize and the test equipment will begin to decode the information located in the lead-in area 1015. Information in the lead-in area 1015 consists of the TOC. The TOC data is stored in the Q-Channel only. The TOC is repeated many times to insure that the pick up will always be able to read the TOC data no matter where the laser pick up starts. Current industry standards require that TOC data be written into nine out of each ten sectors in the lead-in area. At the present there is no error correction in the lead-in area, however, by checking the repetitive data against the CRC value the CD player finds an error-free data block and continues. When TOC data does not match the CRC value in the 98-bit block Q-channel data the player disregards that block and reads the next one. Eventually, the player finds an error free block. It is contemplated that "wrong" data will be placed into a subcode channel, in particular the Q-channel, in such a way that the data will be discarded by a conventional CD player but will be recovered by compliant test equipment of the of the type of FIG. 10 that recognizes this "wrong" data. It is contemplated that one embodiment places this data in the Q-channel of the lead-in area 1015 of the CD 1005. Other embodiments may have the special copy protection sectors placed in the program area and or the lead-out area as well.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the present invention are presented for purposes of illustration and description; they are not intended to be exhaustive or to limit the invention to the precise forms disclosed, obviously many modifications and variations are possible in view of the above teachings. Features described in a particular embodiment can be used by a separately described embodiment. For example channels other than the Q-channel and other areas other than the lead-in area, may be used. Manufacturer ID fields described in a particular mode can be used in another described embodiment. Copy bit protection in the control word may be set regardless of embodiment. Also as a further example, identification of copy protected tracks in the program area can be determined regardless of embodiment. These embodiments were chosen and described in order to best explain the principles of the invention and its practical applications and to thereby enable others skilled in the art to best utilize the invention and various embodiments with various modifications as are suited to the particular use contemplated. It is intended that the scope of the invention be defined by the following claims and their equivalents:

What is claimed is:

1. A method of marking a compact disc, comprising the acts of:

providing copy protection data identifying a particular copy protection scheme from a plurality of copy protection schemes;

formatting at least part of the copy protection data to form at least one copy protection data block conforming to Q subcode channel data block format;

identifying a portion of the compact disc; and applying the at least one copy protection data block to the identified portion of the disc as at least one Q subcode channel data block having a Q subcode mode field encoded with a Q subcode mode value, the at least one Q subcode channel data block further having a Q control field encoded with a Q control value, the Q subcode mode value and the Q control value jointly identifying the particular copy protection scheme; wherein the Q control value has a binary value wherein a value of zero is assigned to the bit of the Q control value representing the unity power of two and the Q subcode mode value is hexadecimal 1.

2. A method of marking a compact disc, comprising the acts of:

providing copy protection data identifying a particular copy protection scheme from a plurality of copy protection schemes;

applying a first part of the copy protection data to the compact disc as the copy protection scheme; and applying a second part of the copy protection data to the table of contents (TOC) of the compact disc as a Q subcode channel data block having a Q subcode mode field encoded with a Q subcode mode value the at least one Q subcode channel data block further having a Q control field encoded with a Q control value, the Q subcode mode value and the Q control value jointly identifying the at least one subcode channel data block as containing copy protection data, wherein the second part of the copy protection data identifies the particular copy protection scheme; wherein the Q control value has a binary value wherein a value of zero is assigned to the bit of the Q control value representing the unity power of two and the Q subcode mode value is hexadecimal 1.

3. A method of marking a compact disc, comprising the acts of:

providing copy protection data identifying a particular copy protection scheme from a plurality of copy protection schemes;

applying a first part of the copy protection data to the compact disc as the copy protection scheme; and applying a second part of the copy protection data to the compact disc as a Q subcode channel data block having a Q subcode mode field encoded with a Q subcode mode value identifying the at least one subcode channel data block as containing copy protection data, wherein the second part of the copy protection data identifies the particular copy protection scheme; the Q subcode channel data block further having a Q control field encoded with a Q control value, wherein the Q control value has a binary value wherein a value of zero is assigned to the bit of the Q control value representing the unity power of two and the Q subcode mode value is hexadecimal 1.

4. The method of claim 3 wherein the Q subcode mode has a value of hexadecimal F.

5. A method of marking a compact disc, comprising the acts of:

composing copy protection data related to a copy protection scheme;

formatting at least part of the copy protection data to form at least one copy protection data block conforming to Q subcode channel data block format;

identifying a portion of the compact disc; and applying the at least one copy protection data block to the identified portion of the disc as at least one Q subcode channel data block having a Q subcode mode field encoded with a Q subcode mode value, the at least one Q subcode channel data block further having a Q control field encoded with a Q control value, the Q subcode mode value and the Q control value jointly identifying the copy protection scheme, wherein:

the Q control value has a binary value wherein a value of zero is assigned to the bit of the Q control value representing the unity power of two and the Q subcode mode value is hexadecimal 1.

6. The method of claim 5 wherein:

the identified portion is in the lead-out area or lead-in area of the compact disc.

7. The method of claim 5 wherein:

the identified portion is in a table of contents (TOC) of the compact disc the TOC consisting of a plurality of TOC sectors; and wherein the Q subcode channel data block replaces a sufficiently small proportion of the plurality of TOC sectors that an ordinary compact disc player will successfully read the TOC.

8. The method of claim 7 wherein:

the sufficiently small proportion is ten percent.

9. The method of claim 7 wherein:

the sufficiently small proportion is less than ten percent.

10. A method of marking a compact disc, comprising the acts of:

composing copy protection data related to a copy protection scheme;

applying a first part of the copy protection data to the compact disc as the copy protection scheme; and applying a second part of the copy protection data to the table of contents (TOC) of the compact disc as a Q subcode channel data block having a Q subcode mode field encoded with a Q subcode mode value the at least one Q subcode channel data block further having a Q control field encoded with a Q control value, the Q subcode mode value and the Q control value jointly identifying the at least one subcode channel data block as containing copy protection data, wherein the second part of the copy protection data identifies the copy protection scheme, wherein:

the Q control value has a binary value wherein a value of zero is assigned to the bit of the Q control valve representing the unity power of two and the Q subcode mode value is hexadecimal 1.

* * * * *